(12) United States Patent
Turolla

(10) Patent No.: US 9,400,490 B2
(45) Date of Patent: Jul. 26, 2016

(54) METHOD AND A SYSTEM FOR AN AUTOMATIC RECOVERY FROM A FAULT SITUATION IN A PRODUCTION PLANT

(71) Applicant: SIEMENS AKTIENGESELLSCHAFT, Munich (DE)

(72) Inventor: Andrea Turolla, Genoa (IT)

(73) Assignee: SIEMENS AKTIENGESELLSCHAFT, Munich (DE)

(*) Notice: Subject to any disclaimer, the term of this patent is extended or adjusted under 35 U.S.C. 154(b) by 407 days.

(21) Appl. No.: 13/893,513

(22) Filed: May 14, 2013

(65) Prior Publication Data

US 2013/0304239 A1 Nov. 14, 2013

(30) Foreign Application Priority Data

May 14, 2012 (EP) .................................. 12167909

(51) Int. Cl.
 *G05B 9/02* (2006.01)
 *G06Q 50/04* (2012.01)
 *G06Q 10/06* (2012.01)

(52) U.S. Cl.
 CPC ......... *G05B 9/02* (2013.01); *G06Q 10/06* (2013.01); *G06Q 50/04* (2013.01); *Y02P 90/30* (2015.11)

(58) Field of Classification Search
 USPC ............................... 700/108–110; 714/26, 55
 See application file for complete search history.

(56) References Cited

U.S. PATENT DOCUMENTS

| | | | | |
|---|---|---|---|---|
| 4,377,000 A * | 3/1983 | Staab | ............................. | 714/55 |
| 5,144,549 A * | 9/1992 | Youcef-Toumi | .... | F16C 32/0444 700/262 |
| 5,247,447 A * | 9/1993 | Korncoff et al. | ............... | 700/108 |
| 5,311,562 A * | 5/1994 | Palusamy | ............... | G21C 17/00 376/215 |
| 5,623,109 A * | 4/1997 | Uchida | ............... | G05B 23/0254 376/215 |
| 5,796,606 A * | 8/1998 | Spring | ............. | G05B 19/41855 700/83 |
| 6,954,713 B2 * | 10/2005 | Eryurek | ........................ | 702/140 |
| 7,162,312 B2 * | 1/2007 | Gross | ................. | G05B 23/0283 700/79 |
| 7,440,932 B2 * | 10/2008 | Gartland et al. | ................. | 706/46 |
| 8,200,346 B2 * | 6/2012 | Thiele | .................... | G05B 17/02 700/44 |
| 8,356,207 B2 * | 1/2013 | Hosek et al. | ..................... | 714/26 |
| 2005/0075748 A1 * | 4/2005 | Gartland et al. | ............... | 700/108 |
| 2008/0126171 A1 * | 5/2008 | Baldwin | ................ | G06Q 10/06 705/7.14 |
| 2008/0198489 A1 * | 8/2008 | Ballard | .................. | G11B 27/36 360/31 |
| 2010/0087968 A1 * | 4/2010 | Chen et al. | ........................ | 701/2 |
| 2012/0238272 A1 * | 9/2012 | Hwang | ............... | H04W 36/245 455/436 |

\* cited by examiner

*Primary Examiner* — Kidest Bahta
(74) *Attorney, Agent, or Firm* — Laurence Greenberg; Werner Stemer

(57) ABSTRACT

A method automatically recovers from a fault situation in a production plant and provides production resources and a manufacturing execution system having a production modeler for modeling the production resources into a plant model and a production scheduler to schedule operations of the modeled production resources. A production controller executes the production process and a fault manager detects fault situations and automatically decides a corrective action. A production resource runs an application for the operation of the production resource and a fault analysis agent provides categorized error situations and checks operational data representing the operation of the production resource against the categorized error situations and when, an error situation occurs, forwards an error event to the fault manager. The error events are collected and then analyzed by a neural network system to assign the error event to an error category. A corrective action is executed on the production resource.

2 Claims, 2 Drawing Sheets

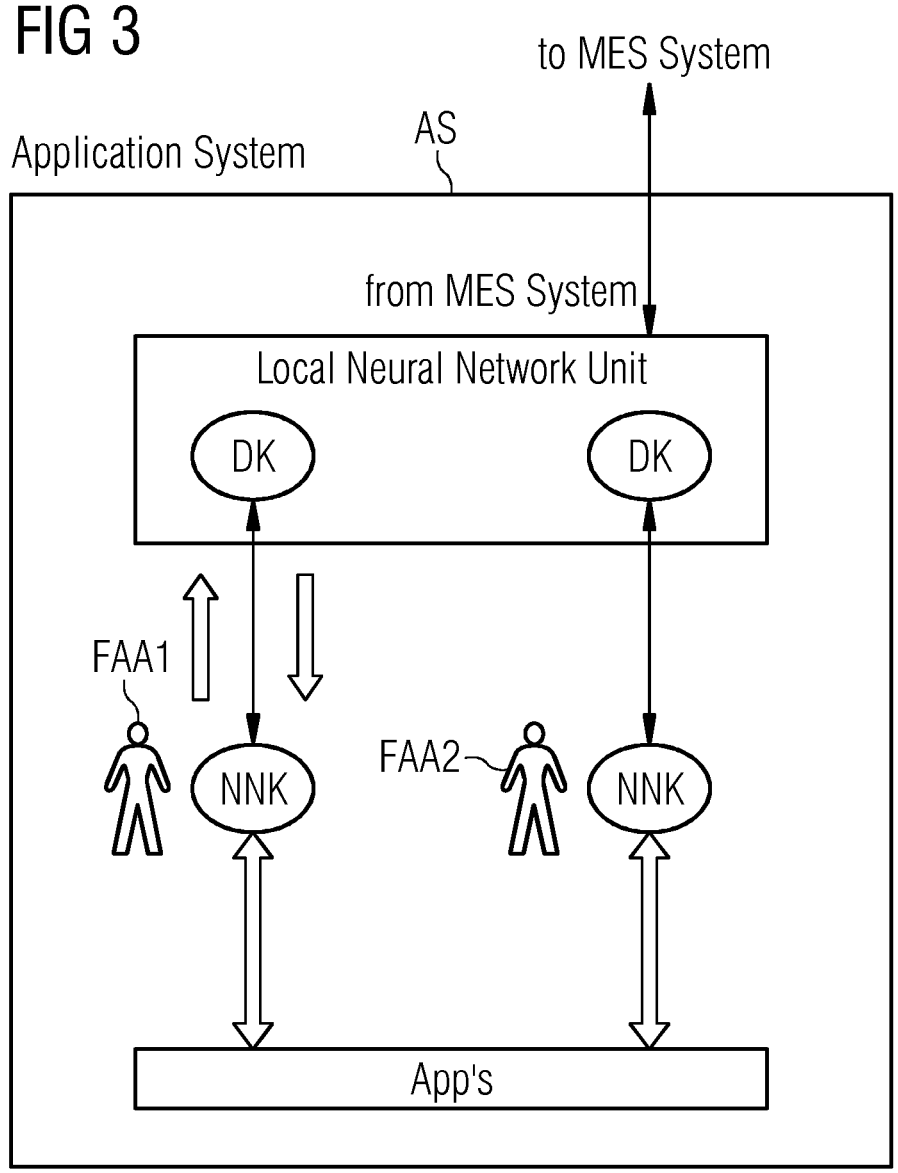

METHOD AND A SYSTEM FOR AN AUTOMATIC RECOVERY FROM A FAULT SITUATION IN A PRODUCTION PLANT

CROSS-REFERENCE TO RELATED APPLICATION

This application claims the priority, under 35 U.S.C. §119, of European application EP 12 167 909, filed May 14, 2012; the prior application is herewith incorporated by reference in its entirety.

BACKGROUND OF THE INVENTION

Field of the Invention

The present invention is related to a method and a system for an automatic recovery from a fault situation in a production plant.

As it is well known in the art according to the ISA S-95 standard, a method for managing and controlling manufacturing processes planned by an enterprise resource planning (ERP) and produced by a shop floor, provides a manufacturing executing system (MES) for implementing the planned manufacturing processes and controlling the corresponding production steps at shop floor.

In particular, the enterprise resource planning (ERP) is a system including hardware devices and corresponding software applications for planning the business resources of an enterprise, i.e. material provisions, human resource managements, purchasing, orders, profits, finance, inventory controls, customer managements, etceteras, while the term "shop floor" has been used to indicate a system supporting the control of single machines involved in the manufacturing processes, for example by measuring the number of pieces produced per hour by each machine or the functioning parameters thereof, the quality of the pieces produced and so on.

MES is an intermediate layer providing computing machines and software tools between the ERP upper layer and the shop floor lower layer, including a software tool for production order management, which receives requests of production from the ERP, and a software tool for production modeling, which supports the engineering phases of selecting and managing the resources to be involved in the manufacturing processes, i.e. employees, machines and materials, in order to realize a planned manufacturing process within required time constrains.

MES is based on the ISA (International Standard Association) standard S95 which defines how software tools may implement the production at the shop floor level and how to communicate with it. More particularly, S95 is substantially based on a manufacturing process represented by a plurality of sequential process segments wherein each sequential process segment contains a plurality of actions to be performed sequentially at the shop floor level.

An execution of the MES software tool described above includes the management of the manufacturing process by activating a sequential process segment and sequentially executing a corresponding plurality of actions.

More particularly, in order to complete a manufacturing process, the software tool for production order management substantially repeats the steps of activating and waiting the end of a plurality of sequential process segments, for a plurality of process segments. In this case, a plurality of software tools, corresponding to respective sequential process segments, is executed for the duration of the corresponding sequential process segment.

With the MES environment, a large demand can be observed in avoiding production downtime caused by unexpected error events of the production resources actually involved in the production process. It is therefore desirable to detect the presence of system faults as soon as possible and to provide suitable solutions in order to recover the system from an error event. Further, system error events are very often predictable when a proper observation of the production process has been implemented. The detection of the errors is therefore usually performed in terms of an analysis of the information incoming from resource-specific applications to constantly verify whether significant deviations from the expected status occur.

Usually, this scenario is charged with a number of problems that may arise during error recovery. In particular, the manual analysis of large amounts of data in a complex production environment is hardly possible which usually leads to reduction of the data being collected for the error detection. Further, the process for rendering a decision and the analysis of the information incoming from the applications can take a rather long time being inacceptable during production. Furthermore, the analysis and the solution finding of the error problem may involve many technical specialists (i.e. technical support team, software architect, software designer and developer) which may also delay a decision and increase its cost accordingly.

In the literature, several solutions use knowledge-based systems in order to detect errors and faults in applications (e.g.: T. Sorsa, H. N. Koivo, H. Koivisto, "Neural Networks in Process Fault Diagnosis", IEEE Trans. Syst., Man. and cyberm., vol. 21, no. 4, p 815-825, 1991) but there are currently neither software products nor corrective systems being capable to remedy the aforementioned problems.

SUMMARY OF THE INVENTION

It is therefore the objective of the present invention to provide a method and a system for an automatic recovery from a fault situation in a production plant that do not require too many resources to identify a suitable recovery plan and that have a positive impact on downtime management in terms of predictive downtime elimination.

The objective is achieved according to the present invention by a method for an automatic recovery from a fault situation in a production plant. The method contains the steps of:

a) providing a number of production resources;
b) providing a manufacturing execution system having at the engineering level a production modeler in order to model the available production resources into a plant model and a production scheduler in order to schedule the operations of the modeled production resources according to a number of production orders, the manufacturing execution system further having at the execution level a production controller in order to execute the production process according to the production schedule and a fault and/or opportunity manager in order to detect fault situations and automatically decide for a corrective action in response to one or more fault situations;
c) running for at least one production resource an application for the operation of the production resource and a fault analysis agent that initially provides at engineering level a number of categorized error situations to the fault and/or opportunity manager and that checks at execution level operational data representing the operation of the production resource against the categorized error situations and that—in case an error situation is present—forwards an error event to the fault and/or opportunity manager;

d) collecting the error events by the fault and/or opportunity manager and analyzing the error events by a neural network system in order to assign the at least one error event to an error category; and e) according to the assignment of the error category deciding by the fault and/or opportunity manager on a corrective action determined for the error category and forwarding the corrective action to the fault analysis agent in order to get the corrective action executed on the production resource and its application respectively.

With respect to the system, the objective is achieved according to the present invention by a system for an automatic recovery from a fault situation in a production plant. The system contains:

a) a number of production resources;

b) a manufacturing execution system containing at the engineering level a production modeler in order to model the available production resources into a plant model and a production scheduler in order to schedule the operations of the modeled production resources according to a number of production orders, the manufacturing execution system further having at the execution level a production controller in order to execute the production process according to the production schedule and a fault and/or opportunity manager in order to detect fault situations and automatically decide for a corrective action in response to one or more fault situations;

c) a number of computing devices for running for at least one production resource an application for the operation of the production resource and a fault analysis agent that initially provides at the engineering level a number of categorized error situations to the fault and/or opportunity manager and that checks at execution level operational data representing the operation of the production resource against the categorized error situations and that—in case an error situation is present—forwards an error event to the fault and/or opportunity manager;

d) the fault and/or opportunity manager for collecting the error events and for analyzing the error events by a neural network system in order to assign the at least one error event to an error category; and e) according to the assignment of the error category the fault and/or opportunity manager to decide on a corrective action determined for this error category and forwarding the corrective action to the fault analysis agent in order to get the corrective action executed on the production resource and its application respectively.

The method and the system therefore comprise a technique for an automatic data collection analysis including the clustering of the upcoming error events whereas the automatic recovery from the error events is triggered by a software assistant which does not involve a human intervention during execution of the error recovery algorithm. Therefore, the method and the system use the fault analysis agent in order to actively change the behavior of an application according to the detection of critical errors by the neural network system. Consequentially, the production system remains always in a state of proper functioning. The fault analysis agent plays a dual role. The collection of large amounts of heterogeneous data from the resource-specific software application under exam, and, if something requires a correction, acting on such applications in order to correct improper behaviors.

Other features which are considered as characteristic for the invention are set forth in the appended claims.

Although the invention is illustrated and described herein as embodied in a method and a system for an automatic recovery from a fault situation in a production plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is a schematic view of a second embodiment of the automatic error recovery system used in FIG. 1.

DETAILED DESCRIPTION OF THE INVENTION

Figure 1:
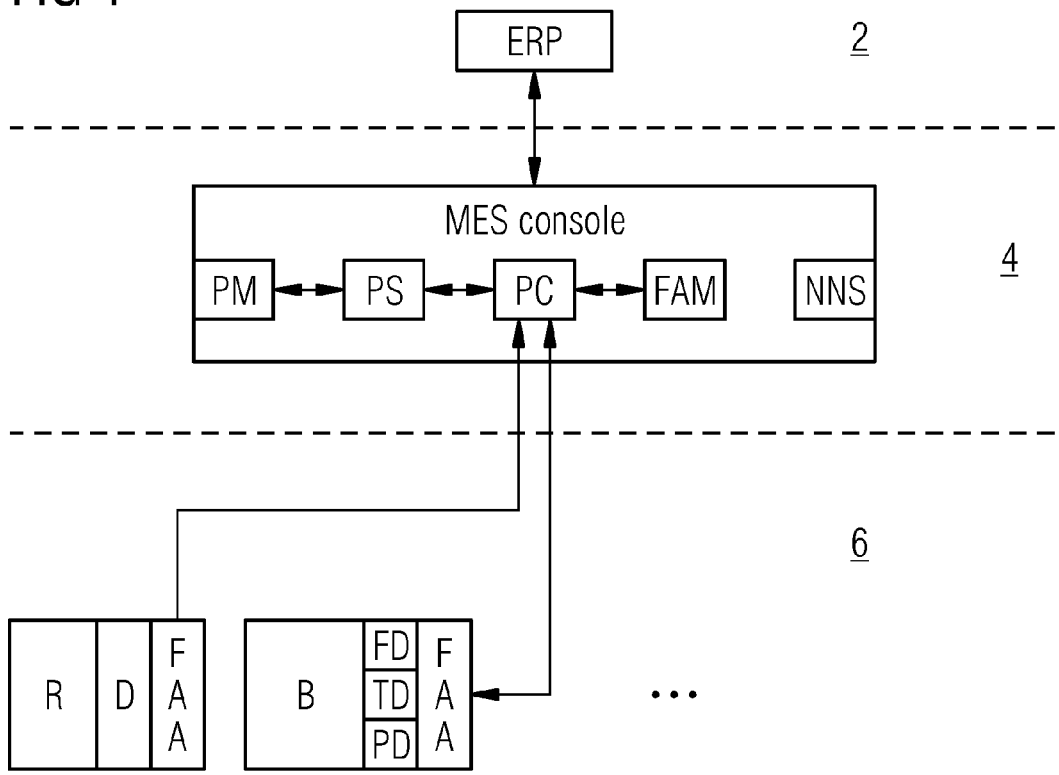
FIG. 1 is a schematic view of architecture of a manufacturing execution system containing means for automatic error recovery according to the invention.

Referring now to the figures of the drawing in detail and first, particularly, to FIG. 1 thereof, there is shown a schematic view of the architecture of a system for managing and controlling manufacturing processes planned by an enterprise resource planning (ERP) at an upper level 2 and produced by a shop floor at a lower level 6 wherein a manufacturing executing system (MES) at a medium level 4 is used for implementing the planned manufacturing processes and controlling the corresponding production steps at shop floor.

In particular, the enterprise resource planning (ERP) is a system including hardware devices and corresponding software applications for planning the business resources of an enterprise, i.e. material provisions, human resource managements, purchasing, orders, profits, finance, inventory controls, customer managements, etceteras, while the term "shop floor" has been used to indicate a system supporting the control of single machines R involved in the manufacturing processes, for example by measuring the number of pieces produced per hour by each machine or the functioning parameters thereof, the quality of the pieces produced and so on.

The software console MES, at the intermediate layer 4, provides computing machines and software tools between the ERP upper layer 2 and the shop floor lower layer 6, including a software tool for production order management, which receives requests of production from the ERP, and a software tool containing various software modules. Usually, a production modeler PM supports the engineering phases of selecting and managing the resources R to be involved in the manufacturing processes, i.e. employees, machines and materials, in order to realize a planned manufacturing process within required time constrains. The manufacturing process itself is scheduled by a production scheduler PS which uses the data being entered at engineering level into the production modeler PM.

For the execution of the production process the MES software tool described above includes a production controller PC which activates sequential process segments and executes the corresponding plurality of actions.

The afore-mentioned MES console is presently expanded to provide also a system for an automatic recovery from a fault situation in a production plant. Presently, a number of production resources R, B are comprised wherein R stands exemplarily for any kind of resources and B shall stand for a boiler which is used to provide hot water to a production process, such as food manufacturing. The manufacturing execution system MES console contains at engineering level a production modeler PM in order to model the available production resources R, B into a plant model and a production scheduler PS in order to schedule the operations of the modeled production resources R, B according to a number of production orders. At execution level, a production controller PC is comprised in order to execute the production process according to the production schedule. Further, a fault and/or opportunity manager FAM is included in order to detect fault situations and automatically decide for a corrective action in response to one or more fault situations.

Furthermore, a number of computing devices for running for at least one production resource B an application for the operation of the production resource B and a fault analysis agent FAA that initially provides at engineering level a number of categorized error situations to the fault and/or opportunity manager FAM and that checks at execution level operational data representing the operation of the production resource B against the categorized error situations and that—in case an error situation is present—forwards an error event to the fault and/or opportunity manager FAM.

The fault and/or opportunity manager FAM collects the error events and analyses the error events by a neural network system NNK in order to assign the at least one error event to an error category. According to the assignment of the error category the fault and/or opportunity manager FAM decides on a corrective action determined for this error category and forwarding the corrective action to the fault analysis agent FAA in order to get the corrective action executed on the production resource B and its application respectively.

In the present example, the boiler B contains a filling level meter FD, a temperature detector TD and a power consumption detector PD. The data stemming from these three detectors is periodically analyzed by the fault analysis agent in order to identify whether an application running the boiler B is working properly.

Figure 2:
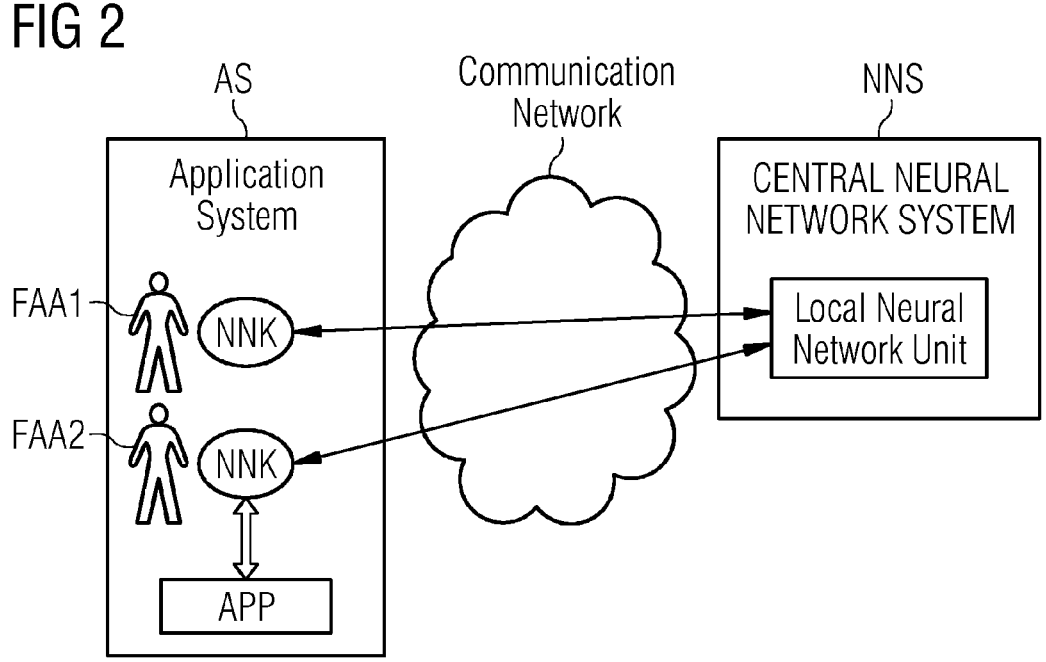
FIG. 2 is a schematic view of a first embodiment of the automatic error recovery system used in FIG. 1.

FIG. 2 now illustrates a first embodiment of the automatic fault recovery mechanism in the present system. On the one hand, an application system AS where the applications App to be analyzed are executed hosts a number of fault analysis agents FAA1, FAA2. At the beginning of the operation the fault analysis agent FAA1, FAA2, transfers the application specific neural network knowledge NNK to a central neural network system NNS. During operation, for example the boiler application, the fault analysis agent FAA1, FAA2 analyzes the data and checks the data against categorized error situations which have been transferred as part of the neural network knowledge NNK to the central neural network system NNS. In the case where an error situation is present the fault analysis agent FAA forwards an error event to the fault and/or opportunity manager which is part of the central neural network system NNS. The central neural network system NNS collects the error events by its fault and/or opportunity manager and analyzes the error events by its neural network logic in order to assign the at least one error event to an error category and derive from the neural network logic to a predetermined corrective action. Now, the fault and/or opportunity manager forwards the error category deducted by the neural network logic as well as the corrective action determined for the deducted error category back to the fault analysis agent FAA of the application App to be analyzed. Automatically, the fault analysis agent FAA now executes the corrective action on the application App of a production resource B.

With respect to the boiler B, the heating operation can be switched to higher or lower energy consumption. For example, the ongoing generation of limescale may lower the efficiency of the heating elements which is tolerable for a predetermined energy consumption threshold in view of the heating gradient still achievable.

Therefore, the system offers an automatic data collection analysis for the categorization of errors. The automatic error recovery is then triggered by the fault analysis agents FAA which directly acts on the disturbed application App in order to correct its improper behavior. The messages analyzed by the fault analysis agent FAA can be of two types. First type of messages are specific application parameters, like critical error that the application dispatches (e.g. due to a database disconnection) or warning on improper behavior of a resource and/or its application App. The second type are general system parameters, such as a network connection status, a CPU load, a private memory usage, a handle usage and the like.

In the prior art, the workflow for the management of error situations requires software agents to provide information properly filtered to the technical support team, available 24/7. The technical support team can propose appropriate solutions in a rather short time to the operator of the production plant which substantially depends on the complexity of the error scenario and the importance of the problem. It is apparent the downtime stretches the more the solution for an error scenario requires the involvement of various professionals. According to the present invention, this analysis of the error scenario is performed by the neural network in terms of its fault and/or opportunity manager which uses the "learned" neural network knowledge NNK in order to analyze the error messages and to identify the underlying problem as well as to propose a possible solution which acts automatically via the fault analysis agent FAA on the respective application App.

It is therefore the number of fault analysis agents FAA that are enabled to influence directly the behavior of the respective application in order to drive the status of the overall production system along a faultless status.

FIG. 3 now illustrates a second embodiment of the automatic fault recovery mechanism in the present system which is only slightly amend as compared to the embodiment shown in FIG. 2. This embodiment provides a distributed neural network system where the fault and/or opportunity manager locally uses the deposited knowledge DK and is executed within the application system AS of the application App to be analyzed. The main advantage may reside in the fact that the distributed neural network system is inherently more robust because, for example, fault analysis agents FAA can be interchangeable and a downtime of a local neural network system does not involve all applications running in the MES (except those running in the local application system where the local neural network system is incorporated).

The invention claimed is:

1. A method for automatic recovery from a fault situation in a production plant, which comprises the steps of:
  providing a number of production resources being machines for operating manufacturing processes;
  providing a manufacturing execution system containing at an engineering level a production modeler modeling available production resources into a plant model and a production scheduler scheduling operations of modeled production resources according to a number of production orders, the manufacturing execution system further containing at an execution level a production controller to execute a production process according to a production schedule and a fault manager for detecting fault situations and automatically decide a corrective action in response to at least one fault situation;

running on a computer, for at least one of the production resources, an application for the operation of the production resource and a fault analysis agent that initially provides at the engineering level a number of categorized error situations to the fault manager and checks at the execution level operational data representing the operation of the production resource against the categorized error situations and when, an error situation is present, forwards an error event to the fault manager;

collecting error events by the fault manager and analyzing the error events by a neural network system for assigning the error event to an error category;

according to an assignment of the error category, deciding by the fault manager on a corrective action determined for the error category and forwarding the corrective action to a fault analysis agent for getting the corrective action executed on the production resource and its application respectively for continuing an uninterrupted production process;

analyzing production process data for predicting future error situations thus predicting a future error situation before the future error situation becomes an actual error situation and a future corrective action is determined based on the categorized error situations stored in the fault manager; and executing, automatically, the corrective action on the application of the production resource by the fault analysis agent.

2. A system for automatic recovery from a fault situation in a production plant, the system comprising:

a number of production resources being machines for operating manufacturing processes;

a manufacturing execution system containing at an engineering level a production modeler modeling available production resources into a plant model and a production scheduler scheduling operations of modeled production resources according to a number of production orders, said manufacturing execution system having at an execution level a production controller to execute a production process according to a production schedule and a fault manager for detecting fault situations and automatically deciding for a corrective action in response to at least one fault situation;

a number of computing devices for running for at least one of said production resources an application for an operation of said production resource and a fault analysis agent that initially provides at the engineering level a number of categorized error situations to said fault manager and checks at the execution level for operational data representing the operation of the production resource against categorized error situations and when, an error situation is present, forwards an error event to said fault manager;

said fault manager collecting error events and analyzing the error events by a neural network system for assigning the error event to an error category;

said fault manager deciding on a corrective action determined for the error category in accordance with an assignment of the error category and forwarding the corrective action to a fault analysis agent for getting the corrective action executed on the production resource and its application respectively for continuing an uninterrupted production process;

said fault manager analyzing production process data for predicting future error situations thus predicting a future error situation before the future error situation becomes an actual error situation and a future corrective action is determined based on the categorized error situations stored in the fault manager; and the fault analysis agent automatically executes the corrective action on the application of the production resource.

* * * * *